Nov. 24, 1959    E. L. BRONSTIEN, JR., ET AL    2,913,736
MECHANICALLY OPERATED SOFA BED
Filed Feb. 6, 1956            6 Sheets—Sheet 2
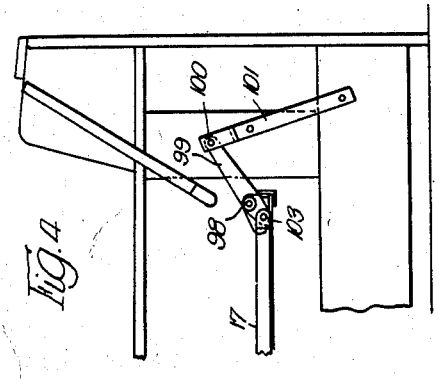
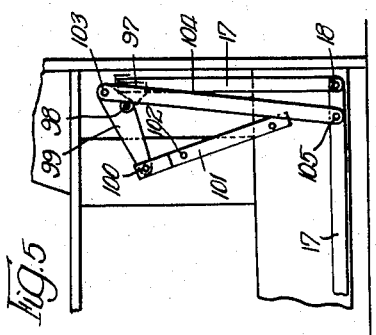
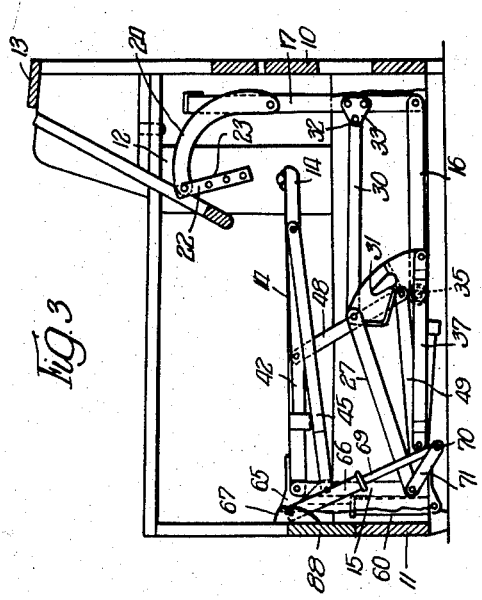
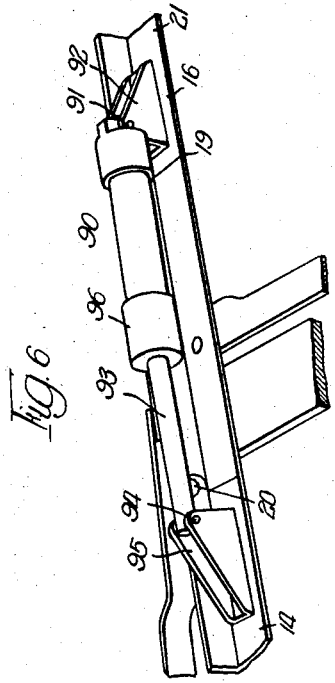
INVENTORS
Edward L. Bronstien Jr.
Richard A. Fisher
BY
Ooms, McDougall, Williams & Hersh
ATTORNEYS Nov. 24, 1959 E. L. BRONSTIEN, JR., ET AL 2,913,736
MECHANICALLY OPERATED SOFA BED
Filed Feb. 6, 1956 6 Sheets-Sheet 3
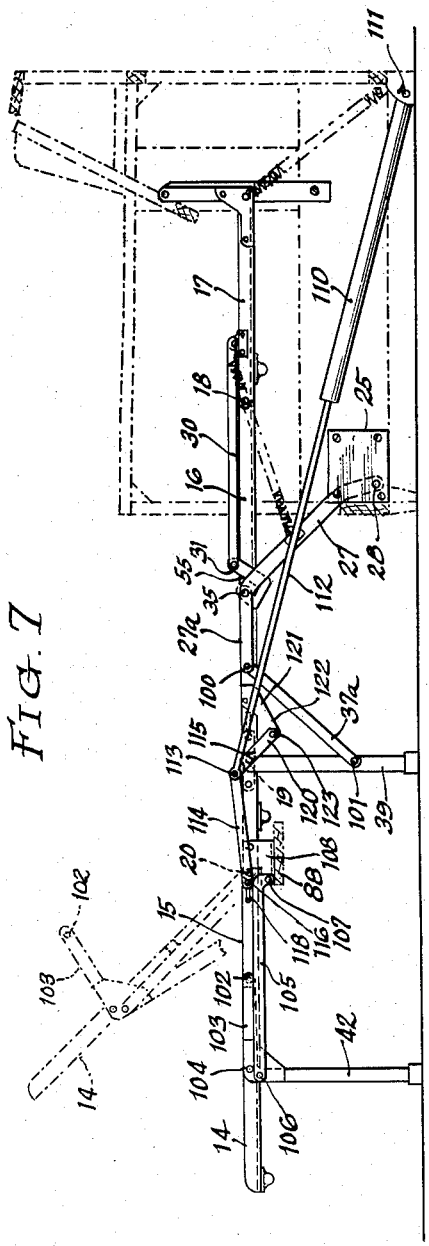
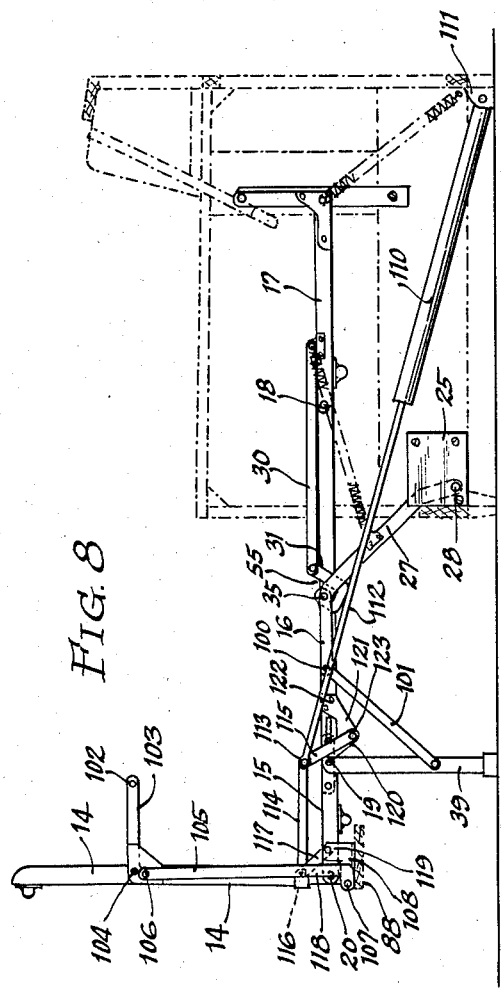
INVENTORS
Edward L. Bronstien, Jr.
BY Richard A. Fisher
Ooms, McDougall,
Williams & Hersh
Attorneys

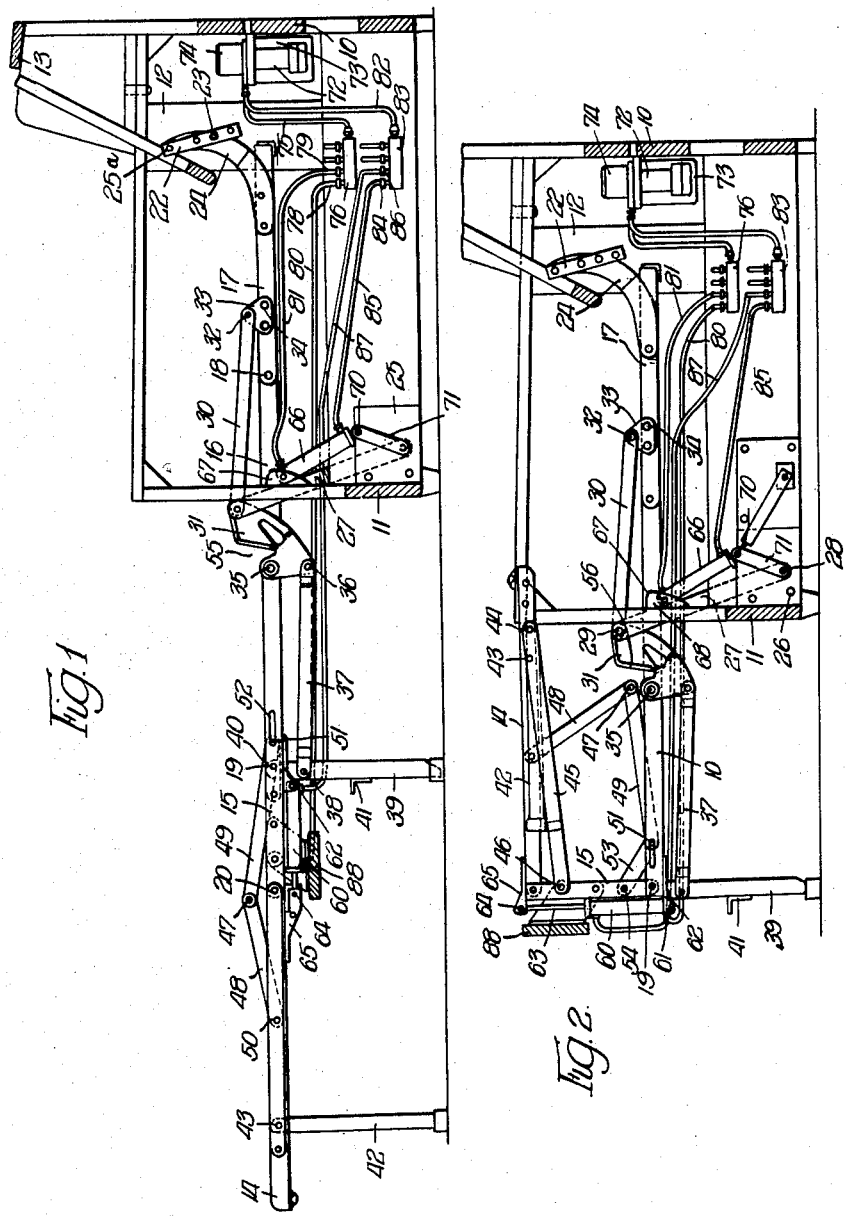

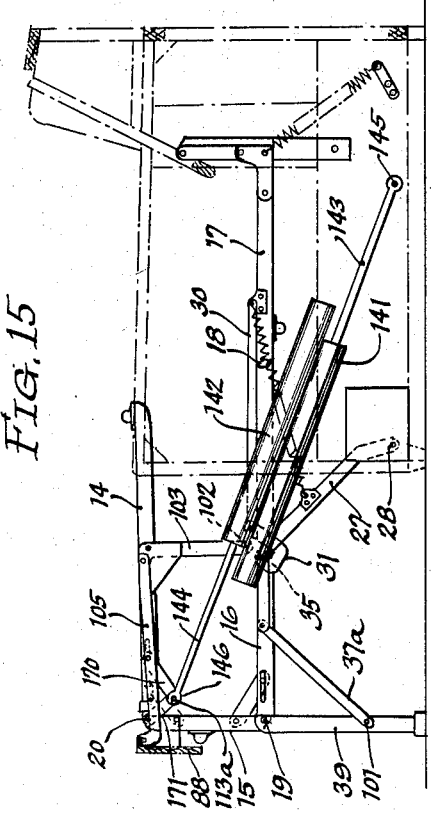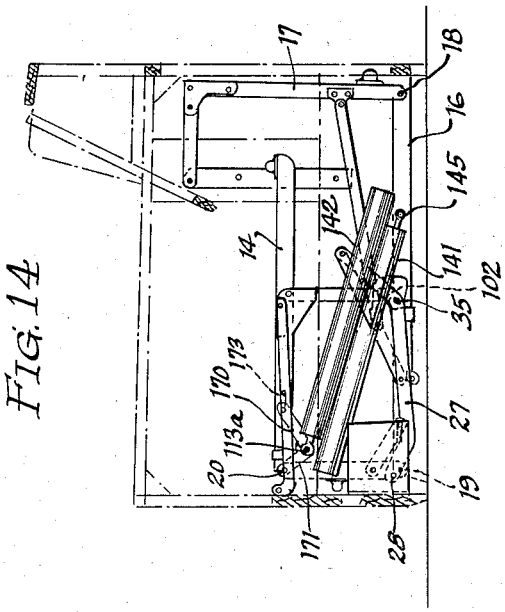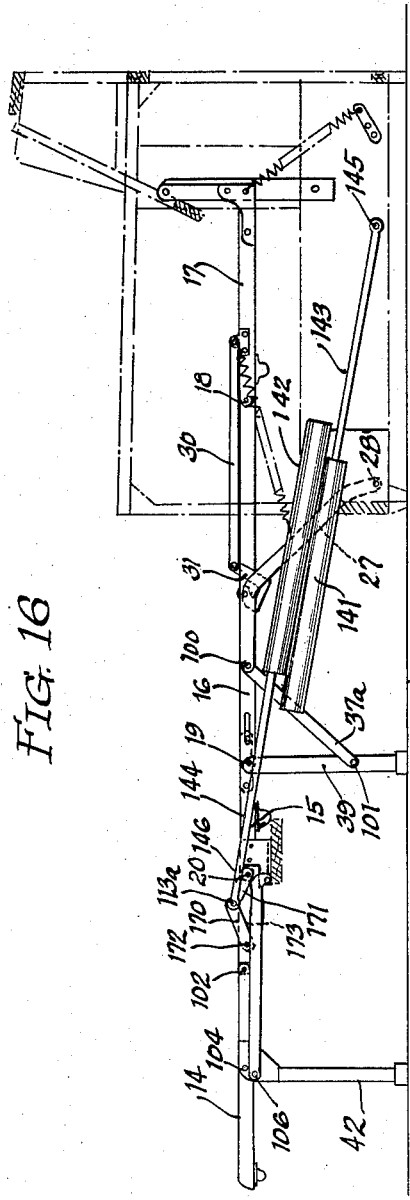
INVENTORS
Edward L. Bronstien, Jr.
Richard A. Fisher
BY Ooms, McDougall,
Williams & Hersh
Attorneys

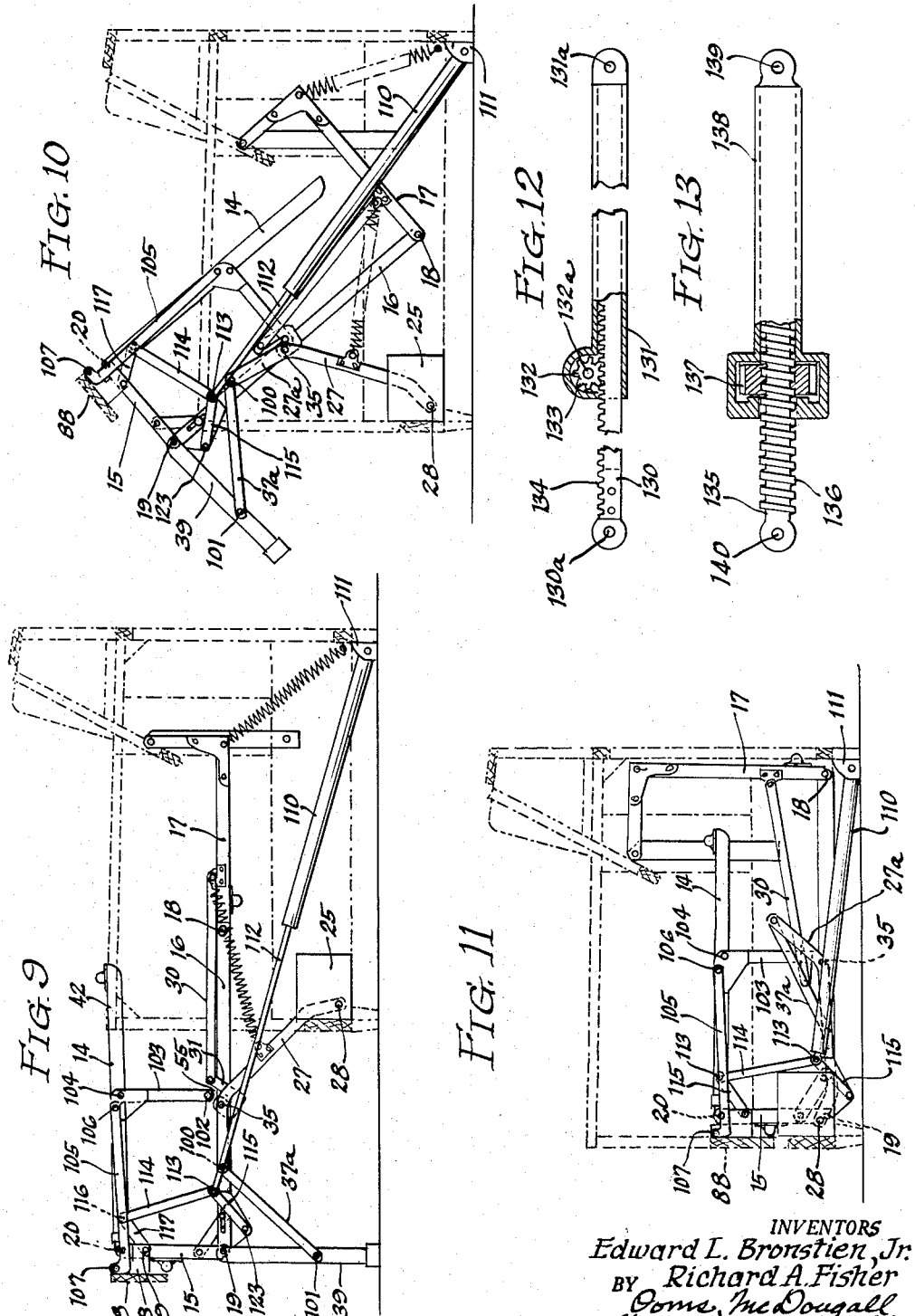

Nov. 24, 1959 E. L. BRONSTIEN, JR., ET AL 2,913,736
MECHANICALLY OPERATED SOFA BED
Filed Feb. 6, 1956 6 Sheets-Sheet 6
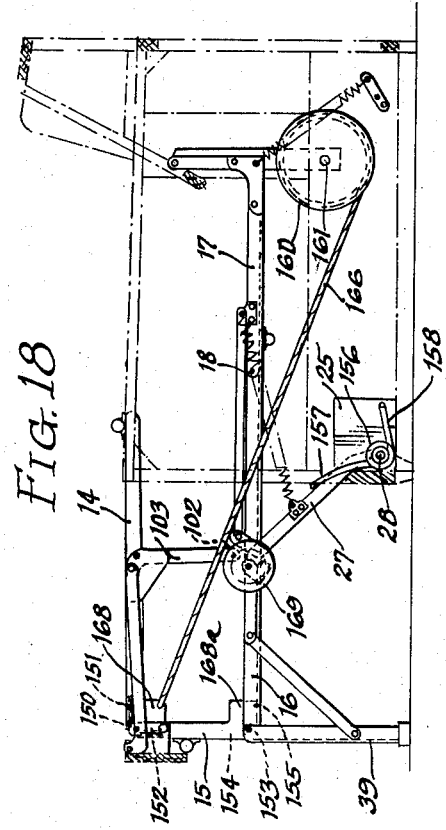
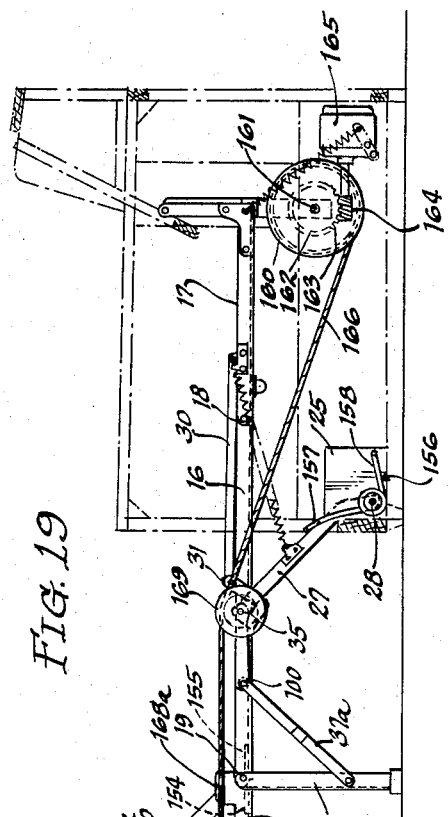
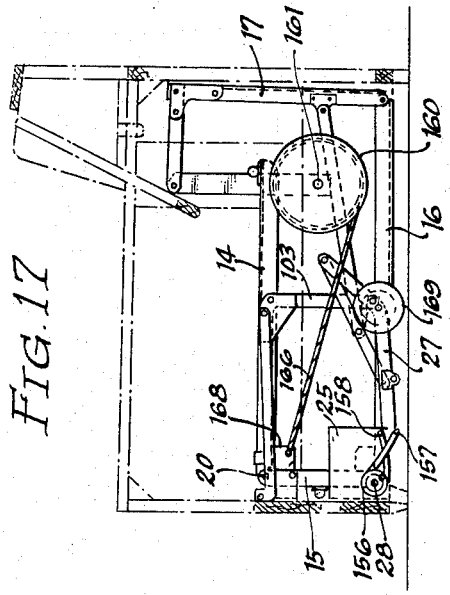
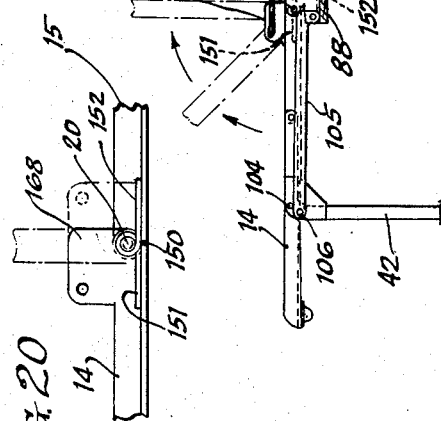
INVENTORS
Edward L. Bronstien, Jr.
BY Richard A. Fisher
Ooms, McDougall,
Williams E. Welsh
Attorneys

United States Patent Office 2,913,736
Patented Nov. 24, 1959

2,913,736

MECHANICALLY OPERATED SOFA BED

Edward L. Bronstien, Jr., St. Paul, and Richard A. Fisher, Minneapolis, Minn., assignors to The United States Bedding Co., St. Paul, Minn., a corporation of Minnesota Application February 6, 1956, Serial No. 563,584

4 Claims. (Cl. 5—13)

This invention relates to a sofa bed and an improvement in the construction thereof which enables operation to be more easily and quickly effected for conversion from a bed to a sofa and vice versa.

To the present, the primary effort in the design and construction of sofa beds has been to simplify their construction and operation and to design various parts for maximum utilization of forces available to assist in the actuation for conversion from a sofa to a bed or from a bed to a sofa. Notwithstanding the many improvements which have been made from a structural standpoint, operation for unfolding or folding the sofa beds to extended or bed position and folded or sofa position still requires considerable effort and the burden for operation presents one of the more serious obstacles to the enthusiastic acceptance of such sofa beds and such structures.

It is an object of this invention to produce a sofa bed which is free of the objectionable features heretofore confronting the enthusiastic acceptance of sofa beds and it is a related object to provide a sofa bed which is folded and unfolded to sofa and bed positions respectively automatically without effort on the part of the operator or user.

More specifically, it is an object of this invention to produce a sofa bed which embodies power operated means for actuation of the parts to effect adjustments from bed to sofa position and from sofa to bed position thereby to relieve the user of the burden heretofore required to effect such adjustments and it is a further object of this invention to embody means operative in combination with such power operated means for regulating the sequence of operation of parts during folding and unfolding and for latching the various parts to prevent inadvertent operation out of the desired sequence of operation and to hold the various parts at operated position and providing a very desirable compact arrangement when in folded or sofa position.

These and other objects and advantages of this invention will hereinafter appear and for purposes of illustration, but not of limitation, an embodiment of the invention is shown in the accompanying drawings in which:

Figure 1 is a side elevational view of a sofa frame embodying the features of this invention with portions of the frame cut away to show the arrangement of parts;

Figures 2 and 3 are elevational views of the structure shown in Figure 1 in the intermediate and folded positions, respectively;

Figure 4 is a fragmentary view in elevation of a modification for pivotally supporting the bed frame on the sofa frame;

Figure 5 is an elevational view of the modification shown in Figure 4 with the parts in their folded position;

Figure 6 is a perspective view showing a modification in the arrangement of the power operated means for use in actuation of the sofa frame;

Figures 7–11 are side elevational views illustrating a further modification in the power actuation of the bed frame from unfolded to folded position;

Figures 12 and 13 are fragmentary elevational views with parts broken away showing a modification in the power operated means for use in the structure of the type illustrated in Figures 7–11;

Figures 14–16 are side elevational views of a further modification in the power operated means for folding the bed frame between bed and sofa position; and Figures 17–20 are side elevational views of a still further modification in the means for mechanically operating the bed frame from unfolded to folded positions.

To the best of our knowledge and belief, no one before has ever mechanized a sofa bed nor provided means for power actuation to effect the desired folding and unfolding operation of a sofa bed. In accordance with the practice of this invention, the operator is relieved entirely of the work required to effect such folding and unfolding adjustments of the relatively heavy bed frame structure of a sofa bed by the combination of power operated means and an operated connection between the power operated means and various elements of the bed frame structure calculated to provide a desired sequence of operations for displacement of the parts between folded and unfolded position with sufficient flexibility in operation to avoid damage to obstacles encountered or to parts of the structure responsive to inadverent resistance to movement but which provides for positive displacement for actuation to bed or sofa position and the latching of the parts in the various arrangements.

While the invention herein will be described with reference to a four section folding sofa bed of the type described in the copending applications of Richard A. Fisher, Ser. No. 370,985, filed on July 29, 1953, now abandoned, and Ser. No. 494,318, filed on March 15, 1955, it will be understood that the concepts of this invention are applicable also to other types of sofa beds formed of sections folded and unfolded to bed and sofa positions.

This invention is a continuation-in-part of the copending application Ser. No. 453,808, filed on September 2, 1954, and it represents further modifications thereof and improvements thereof.

It has been found in the practice of this invention that it is important and it is a further object of this invention to make use of power operated means which occupies little space and can conveniently be accommodated out of sight within the sofa frame but which is capable of supplying the force requirements necessary for actuation of the parts between folded and unfolded positions. It is important also in this connection for actuation of the parts by means which will remain substantially completely concealed and without interference with the movement of the parts of the bed frame between folded and unfolded positions; which offers no obstacles in the use of the sofa bed as a bed member or as a sofa; which is relatively silent in its operation; which operates without the danger of staining the furniture, bed clothes, carpeting or flooring on which the sofa bed may be supported; which is perfectly safe in its operation; which operates simply in response to button control; which adds little additional weight to the sofa bed, and which enables the sofa bed to be adjusted manually, if necessary, between folded and unfolded positions.

As used herein, the term "sofa frame" is intended to include the rigid, preferably wooden, frame of the sofa composed of the rear wall 10, front wall 11, side walls 12 and a top ledge 13, most of which is covered by upholstery and the like in the finished sofa bed. The term "bed frame" is intended to include the extensible frame sections adapted to be unfolded to open or bed position, as illustrated in Figure 1 of the drawings, or folded to the sofa or closed position, as illustrated in Figure 3 of the drawings, with the bed frame sections more or less confined within the sofa frame in folded position with the outer section 14 uppermost for supporting the cushions of the sofa. Section 14 represents the outer of the four bed frame sections hereinafter referred to as the outer frame section 14, the outer intermediate frame section 15, the inner intermediate frame section 16 and the inner frame section 17, all of which are adapted to extend linearly in substantially end to end relation in a common plane when the bed frame is in the unfolded or bed position, as illustrated in Figure 1. The forward end of the inner frame section 17 is pivoted at 18 to the rearward end portion of the inner intermediate section 16. The forward end portion of the inner intermediate section 16 is pivoted at 19 on the rearward end portion of the outer intermediate section 15 and the forward end portion of the outer intermediate section 15 is pivoted at 20 on the rearward end portion of the outer section 14.

Each of the bed frame sections are formed of side channel members spaced one from the other crosswise by a distance slightly less than the spaced relation between the side walls 12 of the sofa frame with cross brace members interconnecting the side bed frame members for rigidity and support. Since each of the side frame members in each of the sections are constructed similarly to the others opposite thereto and similarly in connection with other parts, it will suffice merely to describe the construction arrangement of one side structure. It is preferred to form the bed frame members of each of the sections of angle irons with the horizontally disposed ledge 21 lowermost and extending inwardly for aiding in the support of a mattress or the like bedding thereon.

In the modifications shown in Figures 1, 2 and 3, the inner bed frame section 17 is pivotally secured at its rearward end portion to the side walls of the sofa frame as by means of a bracket plate 22 which is fixed as by means of screws or bolts 23 to the inner wall at each side of the sofa frame and onto which one end portion of a curvilinear arm 24 is pivoted as at 25ª while the other end portion is rigid with the rearward end portion of the inner frame section 17.

A metal plate 25 is secured as by means of screws or bolts 26 to each side of the sofa frame adjacent the front wall. A lever arm 27 is pivotally secured at 28 to the plate while the other end of the arm 27 is pivotally connected at 29 to the forward end portion of a link 30 and the upper rearward end portion of a bell crank 31. The rearward end portion of the link 30 is pivoted at 32 on the upwardly projecting end of a bracket 33 fixed as by bolts or rivets 34 to the side of the inner bed frame section 17 intermediate its ends.

The bell crank 31 is pivoted intermediate its ends at 35 to the side of the inner intermediate bed plate section 16 in a central portion thereof while the other free forward end portion of the bell crank 31 is pivoted at 36 to the rearward end portion of a link 37 the other end of which is pivoted at 38 to the upper end portion of an intermediate leg 39. The leg comprises a rigid supporting member pivoted at its upper end at 40 which also represents the pivotal point 19 between the outer intermediate section 15 and the inner intermediate section 16. The intermediate supporting legs 39 are integrated in movement one with the other by means of one or more cross brace members 41 in the form of angle irons or rods and the like fixed to intermediate portions of the legs.

In the unfolded or bed position, the outer end portion of the frame is supported by means of another pair of laterally spaced apart legs 42 each of which is pivoted adjacent the upper end portion at 43 to an intermediate portion of the outer frame member 14 while the end portion thereof is pivoted at 44 onto the end of a link 45 having its other end pivoted at 46 onto the side of the outer intermediate section 15 adjacent its forward end.

To the present, description has been made of the basic arrangement of parts which may be employed in a four fold sofa bed for actuation from folded or sofa position to unfolded or bed position. In the construction and operation of a structure of this character, it is desirable automatically to bring the outer frame section 14 into closely spaced parallel relation with the inner intermediate frame section 16 during the folding operation and to latch the outer frame section in the desired position while the frame sections are in folded position and to maintain such latching engagement until such time as the inner frame sections are unfolded. It is desirable to achieve such latching and unlatching operations in response to movement of the inner frame sections to folded and unfolded positions of adjustment. One such means, illustrated in Figures 1–3 of the drawings, comprises a locking pin 47 which extends laterally from the pivotally connected ends of a pair of links 48 and 49. The free end of link 48 is pivoted at 50 on an intermediate portion of the outer frame section 15 and the free end of link 49 is provided with a stud 51 which is slidably received in an elongate slot 52 in the forward portion of the inner intermediate frame section 16. A short link 53 is pivoted at one end on the stud 51 while the other end is pivoted at 54 to the side of the forward intermediate section 15 in closely spaced relation with its pivot 19.

The bell crank 31 is formed with a recess 55 which, when the bed frame is in unfolded or bed position, extends substantially vertically downwardly from the upper edge in position to receive the locking pin 47 therein into which position the pin 47 is displaced when the outer frame section 14 is folded about its pivot 20 to extend at about an angle of 90 degrees from the outer intermediate section 15 and when the outer intermediate section 15 is folded about its pivot 19 to extend at an angle of about 90 degrees with the rearward intermediate section. As a result, when the inner intermediate section and the inner section are displaced toward folded position, the bell crank 31 will be rocked in a counterclockwise direction and the locking pin located in the path of the slot will be engaged by the upper wall 56 of the slot for camming action to displace the pin downwardly and bring the outer frame section down into closer spaced relation with the inner frame section. In the final folded position, the bell crank 31 will be rocked through an angle of about 90 degrees so that the recess 55 in which the locking pin 47 is received will extend substantially horizontally and thereby latch the locking pin in position to resist displacement or separation of the outer frame section 14 from the intermediate frame section 16. It will be understood that other latching means such as are described in the aforementioned copending application Ser. No. 370,985 may also be employed.

In the construction illustrated in Figures 1–3, the power operated means comprises a hydraulic cylinder 60 having its base pivoted at 61 to the end portion of a bracket 62 which extends forwardly beyond the pivot 19 from the body portion of the bracket which is fixed to the underside of the forward end portion of the inner intermediate section 16. The outer end portion of the piston rod 63 is pivoted at 64 to a downwardly extending end portion of a bracket 65 fixed to the underside of the inner end portion of the frame section 14 with the portion to which the piston is pivoted extending rearwardly beyond the pivot 20 when in folded position. This same arrangement is repeated on the other side of the bed frame for balanced operation.

Another hydraulic cylinder 66 has its base pivoted at 67 onto a bracket 68 fixed to the side wall of the sofa frame adjacent its forward end while the end of the piston 69 is pivoted at 70 onto the end of a link 71 which is rigidly connected to the rocker arm 27 at its pivot so that the arm will be rocked with the link about their common pivot. The power system includes a pump 72 in a fluid reservoir 73 and a reversible motor 74 connected for operation of the pump. One port of the pump is connected by one conduit 75 to a manifold 76 which has a number of outlets 78 and 79. One outlet 78 is connected by a conduit 80 to the base of the cylinder 60 and another outlet 79 is connected by conduit 81 to the base of the cylinder 66. The other port of the pump is connected by a conduit 82 to a second manifold 83 having a number of outlets. One outlet 84 communicates through conduit 85 with the outer end of the hydraulic cylinder 66 and another outlet 86 is connected by conduit 87 to the head end of the hydraulic cylinder 60. The conduits are formed preferably of a flexible material to enable flexing action of the conduits during changes in positions of the frame of the cylinders in response to opening and closing movements of the sofa bed. It is desirable to fabricate the conduits of tubing capable of use at high pressure without leakage or breakage for use in the transmission of fluids under pressure for positive operation of the hydraulic cylinders.

Operation

When it is desired to adjust the sofa bed from the unfolded or bed position, shown in Figure 1, to the folded or sofa position, shown in Figure 3, the hydraulic motor 74 is operated for turning movement as by switch means operated through a button or the like for actuation of the pump to circulate fluid under pressure from the reservoir 73 to the manifold 76. Since the force necessary to lift the outer frame sections 14 and 15 about their pivots is considerably less than the force required to lift the inner intermediate and inner sections, the fluid under pressure will flow first from the outlet 78 through the conduit 80 to the base of the cylinder 60. This will cause the piston to be displaced outwardly in the cylinder forcing the bracket 65 in the direction away from the bracket 62 with the result that the outer frame section 14 will be rocked about its pivot 20 until it extends substantially perpendicularly from the end of the forward intermediate section 15. In this position, the end of the bracket 65 to which the end of the piston is pivoted and the end portion of the bracket 62 to which the base of the cylinder is pivoted will still be in alignment offset from the pivot 19 with the result that continued displacement of the piston will cause the forward intermediate bed section 15 also to rock about its pivot 19 until the section 15 extends substantially perpendicularly from the end of section 16 with the outer frame section 14 in position over section 16 in spaced parallel relation therewith. This provides the first phase of the folding operation achieved by the hydraulic cylinder 60 and produces the position of parts shown in Figure 2.

With reference to the particular movement of links and other parts during such operation by the hydraulic cylinder, rocking movement of the outer frame section 14 about its pivot 20 causes the ends of the links 48 and 49 to be displaced in the direction towards each other with resultant displacement of the locking pin outwardly away from the frame sections 14 and 15. As the outer intermediate section 15 begins to rock about its pivot 19, the links 45 react in a manner to cause the forward supporting legs 42 to be rocked on their pivot 43 into position alongside the outer frame section 14. Concurrently, link 53 forces the stud 51 rearwardly in the guide slot 52 thereby moving link 49 rearwardly which in combination with the outward displacement of the links 48 and 49 causes the locking pin 47 to move rearwardly in an arcuate path to a position slightly above and forwardly of the recess 55 in the bell crank 31, as shown in Figure 2.

When the hydraulic cylinder 60 completes its operation and further movement is resisted by the force relationships developed or because of cylinder adjustment for predetermined piston displacement, the hydraulic fluid under pressure takes the next course of least resistance and flows from the outlet 79 through conduit 81 to the base of the hydraulic cylinder 66. This causes outward displacement of the piston 69 for positive actuation of the link 71 to rock the link and the rocker arm 27 about their common pivot 28. As the rocker arm is rotated about its pivot from the position shown in Figures 1 and 2 to the position shown in Figure 3, it functions to carry the inner intermediate section upwardly and rearwardly and then down into the sofa frame, as will hereinafter be described.

As the parts of the bed frame are carried by the rocker arm from the position shown in Figure 2 to the sofa position of Figure 3, the inner section 17 swings about the pivot 25 and assumes a position substantially perpendicular to the inner intermediate section 16 which is displaced rearwardly and down and becomes seated in the space at the bottom of the sofa frame between the rear and front walls with the outer frame section and the outer intermediate frame section positioned in the same relation assumed upon the initial folding step. This relative pivotal movement between sections 16 and 17 causes link 30 to rock the bell crank 31 counterclockwise about its pivot 35 with the result that the locking pin 47 lying in the path of the top wall 56 of the recess 55 is engaged by the wall and cammed in the downward direction to draw the outer frame section more closely to the inner intermediate frame section as the locking pin is displaced farther into the recess which receives the pin in latching engagement. In this position, the locking pin 47 is prevented by the top wall of the recess and relocation of the recess from extending in the horizontal direction thereby firmly to hold the outer frame section in the folded position.

When in the sofa position with the bed frame members folded as illustrated in Figure 3, the inner frame section 17 extends substantially vertically adjacent the back wall of the sofa frame while the inner intermediate section extends forwardly from the bottom thereof across the base of the sofa frame. The forward intermediate section extends substantially perpendicularly upwardly from the forward edge to a level corresponding to the height of the front base section and the outer frame section 14 extends rearwardly in parallel spaced relation with the inner intermediate section 16 thereby to provide a compact unit which comfortably fits within the base of the sofa frame. Seat cushions are placed upon and supported by the outer frame section 14. While in this position, the outer section is held against upward displacement by link 48 and by the locking pin 47 which is latched within the recess 55. A base board 88 is fixed to the forward intermediate section and when the bed frame is folded to sofa position, it becomes vertically aligned with the front wall 11 and has the appearance of an extension thereof.

For unfolding the bed frame from the sofa position of Figure 3 to the open or bed position of Figure 1, the reversing motor 74 is operated for turning movement in opposite direction. This operates the pump in a manner to make 82 the feed line and the conduit 75 the lead line for draining the hydraulic fluid from the outlet ends of the cylinders through the manifold 76 to the reservoir. Oil or other hydraulic fluid is pumped under pressure through the feed line 82 to the manifold 83. Since the latching engagement between the locking pin 47 and the recess bell crank 31 prevents displacement of the frame sections 14 and 15 away from the frame section 16, until the locking pin 47 has been released responsive to return of the inner intermediate section and inner section to unfolded position, the flow of fluid from the manifold 83 is from port 84 through line 85 to the head end of the cylinder 66. This causes displacement of the piston 69 into the cylinder with the result that the link 71 and the rocker arm 27 are rotated in a counter-clockwise direction about their common pivot 28. Such rocking movement of arm 27 carries the inner intermediate section upwardly and forwardly to effect unfolding operations of the inner frame section and the inner intermediate frame section to the position of parts shown in Figure 2.

As the inner section and the inner intermediate section are unfolded to their extended position, link 30 causes the bell crank 31 to rock to its original position of adjustment wherein the locking pin is released for movement upwardly out of the now vertically disposed recess 55 of the bell crank. The resiliency of the members including the mattresses and the like materials of the bed will usually cause some degree of separation between the frame members sufficient to lift the locking pin 47 out of the recess by positive displacement of the outer frame sections 14 and 15 but the hydraulic power operated means will usually await completion of the operation of the cylinder 66 for unfolding the inner frame sections. This is because of the tendency for a cylinder once started to complete its operation before flow of hydraulic fluid under pressure to the next.

Upon substantial completion of the unfolding cycle by the first hydraulic cylinder, fluid flows from port 86 through line 87 to the head of the cylinder 60. This causes inward displacement of the piston rod 63 and subsequent pulling action between the extensions with the result that the frame section 14 is rocked in a counter-clockwise direction about its pivot 20 and the frame section 15 is similarly rocked in a counter-clockwise direction about its pivot 19 until alignment between the hydraulic cylinder and the extensions as the parts are returned to their unfolded or bed position of Figure 1.

As the piston is displaced by the hydraulic fluid under pressure admitted to one end of the cylinder, the fluid displaced by the piston flows from the port at the end to the manifold connected therewith and from there it returns to the reservoir. In the absence of operation of the pump for feeding fluid under pressure to one or the other of the manifolds, the fluid return passages can be made automatically to open in response to forces applied so as to enable the bed sections to be folded or unfolded manually, if desired.

For operation of the parts with power operated means of the type described located on the bottom side of the frame members, it will be apparent that the lines of forces generated by the hydraulic cylinders will be from points adjacent the pivots and in alignment offset from the pivots with pivotal connection between the piston and cylinder to adjacent sections of the bed frame or with a frame section in between if the intermediate frame section represents a short section, as for example section 15 which lies between sections 14 and 16 to which the hydraulic cylinders are connected.

While it is preferred to locate the power operated means out of the way on the underside of the frame members, the power operated means can be positioned on the top side of the frame members, as illustrated in Figure 6 of the drawings. In this modification, a hydraulic cylinder 90 is mounted with the base of the cylinder pivoted on a pin 91 extending across the yoke of a bracket 92 fixed to the top side of the frame section 16 adjacent the pivot 19 while the end of the piston rod 93 is pivoted on a similar bracket 95 fixed to the top side of the frame section 14 adjacent the pivot 20. In this modification, instead of flowing fluid under pressure to the base of the cylinder for causing the sections to fold from bed position to sofa position, the conduit is connected for feeding the pressure fluid to the head 96 of the cylinder. This will cause inward displacement of the piston rod 93 with the result that the sections 14 and 15 would be rocked in the clockwise direction about their pivots to folded position with consequent movement of links and parts as previously described. Reversal of the flow of the fluid will cause reverse movements of the parts to unfold the bed frame to bed position.

It will be understood that power operated mechanical means such as interconnected gears and sectors may be used instead of the described power operated hydraulic means to effect the desired swinging movements. For example, use may be made of an arm pivotally connected at one end to the frame section 14 and rigidly connected at the other end to a sector mounted for rotational movement in response to rotor operation on the forward end portion of the frame section 16. In the alternative, such mechanical power operated means may be provided for interconnecting adjacent frame sections to effect the desired swinging movements.

In Figures 4 and 5, illustration is made of a modification in the means for pivotally mounting the bed frame onto the sofa frame in a manner which permits greater displacement of the entire bed frame during unfolding to bed position without interfering with the flexibility of operations or the compact arrangement of parts when in folded or sofa position. In this modification, the inner frame member 17 has an extension 98 rigid with the inner end thereof for pivotal connection at 98 to an intermediate portion of a link 99. The link is pivoted at its far end at 100 to the upper end portion of a bracket 101 fixed, as by means of screws 102, to the side walls of the sofa frame. Also pivoted at 103 onto the other end portion of the link 99 is an elongate arm 104 the other end of which is pivoted onto the frame section 17 at 105 spaced a short distance from the pivot 18. By this construction, the bed frame is able to be displaced from the back wall of the sofa frame by a greater distance than with the previously described modification without loss in support or in flexibility.

The modifications embodying the features of this invention, which are illustrated in Figures 7–11 inclusive, are represented by a preferred construction in the arrangement of parts forming the bed frame sections and linkages. As illustrated in the above figures, the lever arm 27 is pivoted at 35 intermediate its ends on the bell crank 31 and, when in the unfolded position, the end portion 27ª of the lever arm 27 extends horizontally outwardly beyond the pivot along side the inner intermediate bed frame section 16. A link 37ª is pivoted at 100 onto the end of the lever arm portion 27ª while the other end is pivoted at 101 onto the intermediate portion of the intermediate leg 39. Said linkage operates to fold the leg upwardly along side the inner intermediate section when the lever arm 27 is rocked about its pivot 28 in the clockwise direction to displace the inner intermediate bed frame section and the inner bed frame section 17 from unfolded to folded or sofa position with the outer frame section 14 and the outer intermediate frame section 15 folded as previously defined on the inner intermediate frame section 16.

Instead of making use of a locking pin 47 extending outwardly at the pivotal interconnection between the levers 48 and 49 which are, in turn, pivoted at their other ends on the outer frame section 14 and the inner intermediate frame section 16, respectively, to displace the locking pin into the path of the recess 55 of the bell crank 31 during folding operation of the outer and outer intermediate frame sections 14 and 15, the locking pin 102 is provided on the end of an extension 103 forming a part of the front leg 42 which is pivoted on an intermediate portion of the outer frame section 14 at 104. The leg 42 is rocked through an angle of 90 degrees as the outer frame section 14 is turned to upright position about its pivot 20 thereby to displace the locking pin 102 into the path of the bell crank lever 31 for latching engagement as described as the inner intermediate frame section 16 is folded into the sofa frame.

For actuation of the leg 42 to a position along side the outer frame section 14 in response to rocking movement of the outer frame section from unfolded bed position to folded sofa position, use is made of a link 105 pivoted at 106 at its forward end onto the upper portion of the leg 42 spaced a short distance below its pivot 104 while the other inner end of the link 105 is pivoted at 107 onto a bracket 108 which is rigidly secured to depend from the underside of the outer intermediate frame section 15 somewhat forwardly but below the pivot 20. The front board 88 can be carried by the bracket 108 for use to complete the front wall of the sofa bed when the parts are displaced to folded or sofa position.

In the modification shown in Figures 7–11 inclusive, use is made of a single power operated means on each side of the bed frame in the form of an elongate hydraulic cylinder 110 pivoted at its base upon a bracket 111 fixed to the lower inner end portion of the sofa frame. The piston rod 112 mounted for reciprocal movement within the cylinder 110 extends forwardly from the end thereof into engagement with a pin 113 pivotally interconnecting the inner end portion of link 114 with the outer end portion of link 115. The outer end portion of link 114 is pivoted onto the end portion of a link 117 by means of a pivot pin 116 slidably engaged within a slot 118 in the rearward end portion of the outer frame section 14. The other end of the link 117 is pivoted at 119 onto the forward end portion of the outer intermediate frame section 15 for enabling the outer frame section 14 to be rocked about its pivot through an angle of about 90 degrees during actuation of the outer frame section between folded and unfolded positions. The link 115 is pivoted at its inner end 120 onto the lower end portion of an arm 121 which depends from a bracket 122 fixed to the outer end portion of the inner intermediate frame section 16 thereby to provide a pivot point 123 which is offset downwardly from a line drawn from the pivot 111 for the hydraulic cylinder and the pivotal interconnection at 113 between the links 114 and 115, when in the unfolded position.

In operation, when the bed frame sections 14, 15, 16 and 17 are horizontally disposed in endwise alignment in their unfolded or bed position, as illustrated in Figure 7, introduction of fluid under pressure into the head of the cylinder 110 causes displacement of the piston rod inwardly into the cylinder. As the rod 112 is withdrawn, the pivot point 113 of the links 114 and 115 is displaced rearwardly through an arc having the pivot 123 as its center. Link 114 is concurrently displaced rearwardly while being rocked a short distance in the counter-clockwise direction about its pivot 116 thereby to cause the outer frame section 14 to rock upwardly about its pivot 20 while the pin 116 is displaced upwardly in the slot 118 until the outer frame section extends substantially perpendicularly upwardly from the outer intermediate section 15, as illustrated in Figure 8 of the drawing.

Continued displacement of the piston rod 112 inwardly into the cylinder operates further to cause the link 115 to rock in the clockwise direction about its pivot 123 with further rearward displacement of the pivot 113 and the link 114 pivoted thereon. The line of force extends rearwardly from the outer frame section along a line offset upwardly from the pivot 19 between the outer intermediate frame section 15 and the inner intermediate frame section 16 with the result that the outer frame section 14 and the outer intermediate frame section 15 are caused to rock together about the pivot 19 through an angle of about 90 degrees to position the outer frame section 14 in parallel spaced relation above the inner intermediate frame section 16 while the outer intermediate frame section 15 extends vertically therebetween, as illustrated in Figure 9 of the drawing.

As the outer frame section 14 was rocked about its pivot 20 from the horizontal to vertical position, the reactions through the link 105 between the pivots 106 and 107 operated to rock the leg section 42 and the arm 43 about their pivot 104 to bring the leg 42 along side the outer frame section 14 while the arm 103, having the locking pin 102 on the end thereof, became extended inwardly to position the pin 102 in the path of the recess 55 of the bell crank 31, as illustrated in Figure 9 of the drawing.

In response to further displacement of the piston rod 112 inwardly into the cylinder 110, the force applied to the pivot pin 113 is transmitted through the links 114 and 115 to the outer frame section 14 and the inner intermediate frame section 16 and to the lever 27 upon which the inner intermediate frame section is pivoted to rock the lever 27 in the clockwise direction about its pivot 28. Thus the frame sections are carried by the lever arm 27 through the tilted position shown in Figure 10 to the folded position shown in Figure 11 wherein the bed frame sections become substantially completely housed within the sofa frame in the arrangements previously described with reference to the dual hydraulic systems.

As the inner intermediate and inner frame sections 16 and 17 respectively are displaced rearwardly and angularly relative to each other, as illustrated in Figures 10 and 11, the link 30 becomes effective to rock the bell crank 31 about its pivot 35 to engage the locking pin 102 within the recess 55 thereby to draw the pin into latching engagement. Thus the outer frame section is pulled downwardly into a fixed parallel relation with the inner intermediate frame section 16 and latched thereto responsive to the movement of the inner intermediate and the inner frame sections respectively from unfolded bed position to folded sofa position, as illustrated in Figure 11 of the drawing.

Substantially the reverse reactions take place when the bed frame sections are operated from folded sofa position to unfolded bed position. Referring first to Figure 11 and then to Figures 10 and 9 of the drawing, hydraulic fluid is admitted under pressure to the base end of the cylinder 110 while permitting hydraulic fluid to bleed from the head end thereby to effect displacement of the piston rod 112 outwardly from the cylinder. As the rod shifts outwardly, the force on pivot pin 113 is effective to cause the lever arm 27 to rock in a counter-clockwise direction about its pivot 28 since the outer and outer intermediate frame sections 14 and 15 are incapable of rocking movement from folded to unfolded position until the latching pin 102 is released responsive to movement of the inner intermediate frame section 16 from folded to unfolded position. Thus the lever arm 27 is caused to rock in the counter-clockwise direction about its pivot 28 raising the inner intermediate section 16 upwardly and outwardly while swinging the inner frame section 17 about its pivot until the units reach the horizontally disposed unfolded bed position shown in Figure 9 of the drawing. As the rod 112 continues to be displaced outwardly from the cylinder, pivot 113 is displaced about the pivot point 123 as the center to cause the outer frame section 14 and the outer intermediate frame section 15 to be rocked in the counter-clockwise direction about their pivots until returned to their normal unfolded bed position with concurrent rocking movement of the leg 42 to depending position for support of the unfolded sections, as illustrated in Figure 7 of the drawing.

In Figures 12 and 13 of the drawings, illustration is made schematically of a mechanical means which can be employed instead of the hydraulic means described for effecting movement of the bed frame sections between folded and unfolded positions. In Figure 12, use is made of an elongate rack bar 130 mounted for guided sliding movement endwise in an elongate housing 131. The inner end 131a of the housing 131 can be pivoted at 111 onto the sofa frame while the outer end 130a of the rack bar can be pivotally connected to the pin 113 interconnecting the links 114 and 115. A driving gear 132 mounted for rotational movement on a driving shaft 132a is fixed for rotational movement within the end portion of the housing 131 with its teeth 133 in meshing engagement with the rack teeth 134 in the upper surface of the rack bar to cause lengthwise displacement of the rack bar inwardly and outwardly responsive to operation of the driving gear in one direction or the other. It will be understood that the driving gear 132 may be turned by suitable means such as by an electrical motor, by a pulley system or other power actuation means. The displacement of the rack bar 130 endwise similarly to that of the piston rod 112 operates to effect movement of the bed frame sections between folded and unfolded positions in the manner described in connection with the hydraulic system.

Smoother and more desirable operation mechanically can be obtained when the gear and rack bar system is substituted by a rod 135 having a worm 136 formed on the periphery thereof substantially throughout the length of the rod for operation to effect endwise displacement in one direction or other by a worm gear 137 responsive to turning movement of the worm gear in one direction or the other. The worm gear is mounted for rotational movement in the end portion of an elongate housing 138 which is pivoted at its inner end 139 onto the sofa frame while the outer end 140 of the rod 135 is pivoted onto the pin 113 to effect the described movement of the bed frame sections between folded and unfolded positions. The worm gear 137 may be operated by a gear train actuated through an electrical motor or the like.

In the modifications shown in Figures 14–17, the elongate hydraulic cylinder and the piston rod 112 is replaced by a pair of interconnected hydraulic cylinders 141 and 142 supported in space between piston rods 143 and 144 respectively extending outwardly therefrom. The lower cylinder 141 has its head extending in the direction towards the sofa frame while the cylinder 142 has its head extending in the direction towards the pivot pin 113a. It will be understood that the directions of the cylinders may be reversed without changing the operation of the system. The rod 143 operative in the cylinder 141 is pivoted at its outer end 145 to the lower rearward end portion of the sofa frame. The piston rod 144 operative in the cylinder 142 is pivoted at its outer end 146 to the pivot pin 113a of the bed frame sections described.

In the modification of Figures 14, 15 and 16, the pivot pin 113a pivotally interconnects links 170 and 171. The other end of link 170 has a pin 172 which is slidable longitudinally in a slot 173 in a portion of the outer frame section 14 spaced from the pivot 20. The other end portion of the link 171 is pivotally secured to the outer end portion of the outer intermediate section 15 adjacent the pivot 20 so that the pivot 113a extends upwardly beyond the aligned frame sections when in unfolded position whereby the connecting rod 144 pivotally connected to the pin 146 stretches upwardly beyond the pivot so that inward displacement of the rod 144 will cause the outer frame section 14 to be folded about its pivot to its upright position and whereby continued inward displacement of the piston rod 144 will thereafter cause the outer intermediate frame section to be rocked in the clockwise direction about its pivot 19 to folded position, as illustrated in Figure 15 of the drawing.

In the described system flow of hydraulic fluid under pressure into one or the other of the cylinders can be controlled in the manner described heretofore in the dual system wherein two separate cylinders are employed but the flow need not be controlled in the described system since admission of fluid under pressure to the head end of the cylinders will have the same effect whether admitted to one or the other. Thus when in the unfolded position shown in Figure 16, fluid under pressure is introduced into the head end of cylinder 142 to cause rearward displacement of the piston rod 144, the outer frame section 14 and the outer intermediate section 15 will rock about their pivots 19 and 20 respectively, as previously described, to the position shown in Figure 15 of the drawing. The locking pin 102 will lie in the position to be received within the recess 55 of the bell crank 31 to latch the frame sections to the inner intermediate frame section as the inner intermediate and the inner frame sections 16 and 17 are subsequently displaced from unfolded to folded sofa position.

When the stroke of the piston rod 144 is completed, fluid under pressure is admitted to the head end of the cylinder 144 to cause the cylinder 141 to move upwardly on the rod 143 thereby to continue the inward displacement of the cylinder 142 and its piston rod 144 whereby the bed sections are caused, as previously described, to be displaced from unfolded to folded position as the lever arm 27 is rocked in its clockwise direction about its pivot 28 unless the bed frame sections reach their folded positions as illustrated in Figure 14 of the drawing. It will be apparent that the same linear displacement of the rod 144 would take place if the fluid were admitted first into the head end of cylinder 141 followed by admission into the head end of cylinder 142 since the two cylinder units act as one in applying the desired displacement on a single point but wherein the combined cylinder sections operating in space between the connecting piston rods 143 and 144 permit elements to be employed having a shorter stroke and therefore greater rigidity and strength in operation.

Again the reverse takes place upon actuation of the frame sections from folded sofa position to unfolded bed position. Fluid is admitted into the base of one or the other of the cylinders 141 or 142 to cause outward displacement of one or the other or both of the piston rods 143 and 144 to cause lengthening of the rod and cylinder assembly concurrently to displace the piston pin 113 in the outward direction. As a result, the force operates at first to rock the lever arm 27 in the counter-clockwise direction about its pivot 28 to unfolded inner frame section 17 and the inner intermediate frame section 16 with concurrent release of the locking pin folding the outer frame section 14 in folded position. Continued displacement of the piston rods and cylinder assembly causes the outer intermediate and outer frame sections 15 and 14 respectively to unfold to bed position as previously described.

In the modification illustrated in Figures 17–20, the frame sections are the same but the system for actuation of the parts between folded and unfolded positions differs somewhat from the concepts previously described. Instead of making use of positive actuation of the parts by mechanical or hydraulic force, use is made of resilient means of sufficient capacity constantly to urge the frame sections to their unfolded position while use is made of mechanical means for controlling the movement of the bed frame sections from folded to unfolded positions and for actuating the bed frame sections against the force of the resilient means for movement from unfolded to folded sofa bed position.

In the illustrated modification, a spring 150, such as a coil or leaf spring, is mounted between the outer frame section and the outer intermediate frame section 15 and preferably about its pivot 20 with one end portion 151 of the spring anchored onto the adjacent portion of the outer frame section 14 while the other end 152 of the spring is anchored onto the adjacent end portion of the outer intermediate section 151 constantly to urge the outer frame section 14 to rock in the counter-clockwise direction about its pivot 20 to unfolded position with a force sufficient to overcome normal resistance to such movement.

Another spring 153, similar in construction to the spring 150, is mounted between the outer intermediate frame section 15 and the inner intermediate frame section 16 and preferably about the pivot 19 with one end 154 of the spring anchored onto the adjacent end portion of the outer intermediate section 15 while the other end 155 is anchored onto the adjacent end portion of the inner intermediate frame section 16 constantly to urge the outer intermediate frame section to rock in the counterclockwise direction about the pivot 19 to unfolded position with a force sufficient to overcome normal resistance to such movement.

A spring 156 is also mounted on the metal plate 25 and preferably about the pivot 28 for the lever arm 27. One end 157 of the spring is anchored onto the adjacent portion of the lever arm 27 while the other end 158 is anchored onto the plate 125 or sofa frame thereby constantly to urge the lever arm 27 to rock in the counter-clockwise direction about its pivot with a force sufficient to overcome any normal resistance to movement of the lever arm for displacement of the inner intermediate section 16 and the inner frame section 17 from folded to unfolded position.

A pulley 160 is mounted for free rotational movement on a shaft 161 which is supported in fixed relation in the lower rearward end portion of the sofa frame. Rigid with the pulley is a driving gear 162 having teeth 163 in the periphery thereof in engagement with a worm 164 adapted to be driven in one direction or the other by a reversible motor 165. It will be apparent that other means may be employed for actuation of the gear in one direction or the other.

Wound about the pulley 160 is a flexible cable 166 which extends forwardly for attachment to an ear 168 that extends upwardly in fixed relation from a portion of the outer frame section 14 closely spaced from the pivot 20 whereby the cable 166 extends along the side offset upwardly beyond the pivot 20 when the elements are in their unfolded position. Although it is not essential for the operation of the structure, it is preferred to make use of an idler roller 169 mounted for free rotational movement on a part of the inner intermediate frame section 16 or on the corresponding portion of the lever arm 27 adjacent the bell crank 31 and over which the intermediate portion of the cable 166 is stretched for use of the roller 169 as a guide and also to elevate the run of the cable to the ear 168 when in unfolded position.

In operation, the motor 165 turns the gear 162 and the pulley 160 for rotational movement in the counter-clockwise direction in Figure 17 to cause the pulley to take up the cable 166 with the result that a force is applied onto the ear 168 sufficient to overcome the springs 150 and 153 whereby the outer frame section 14 is caused to rock about its pivot 20 to an upright position and then the outer intermediate section 15 is caused to rock about its pivot 19 to bring the outer section 14 over the inner intermediate section 16 with the locking pin 102 positioned in the path of the recess 55 of the bell crank 31, as illustrated in Figure 18 of the drawing.

As the cable 166 continues to be taken up, the inner intermediate and inner frame sections 16 and 17 respectively are displaced from unfolded to folded positions as the lever arm 27 is rocked in the clockwise direction about its pivot with concurrent latching of the locking pin 102, as previously described and as illustrated in Figure 19 of the drawing.

While the movements in reverse are the same as previously described, the forces which operate are not identical. In movement from folded to unfolded position, the pulley 160 operating cable 166 functions as a control rather than as the force which effects such movements. The spring members 150, 153 and 156 operate to effect return of the elements from folded to unfolded positions as the elements are released for such movement by the cable.

As the cable is let out by reversal of the motor 165, the spring 156 becomes effective to cause the lever arm 27 to rock about its pivot 28 in the counter-clockwise direction to displace the inner frame section 17 and the inner intermediate frame section 16 from folded to unfolded positions, as shown in Figure 18. As the latching pin 102 is released and as the cable is let out further, the springs 150 and 153 become effective to rock the outer intermediate section 15 and the outer frame section 14 from folded to unfolded positions thereby to effect opening movements of the bed to the position shown in Figure 17.

It will be apparent that the cable can be anchored at its free end onto other portions of the frame section such as on the pin 113 in the modifications of Figures 7–16 and that other means may be employed for effecting the rotational movement of the pulley in one direction or the other or for taking up or letting out the cable.

Instead of making use of the bracket 168 to which the end of the cable 166 is attached, use can be made of a rectangularly shaped corner bracket, as illustrated in Figure 20 of the drawing, located on the end portion of the outer frame section 14 in position to have the inner side wall of the bracket engage the flange on the frame member forming the outer intermediate section 15 when in vertically disposed position relative thereto as indicated by the broken lines in Figure 20 to limit the extent of relative movement and to function as a stop plate to align the one section in perpendicular relation to the other. A similar stop plate 168ᵃ may be provided on the inner end portion of the outer intermediate flange section for engagement with the flange on the frame member of section 16 to stop the angular movement of the one section relative to the other in the desired position.

From this description, it will be evident that there is provided a major advance in the construction and use of sofa beds which eliminates the burden of folding and unfolding the bed between bed and sofa positions and that such operations can be effected easily and quickly and without danger and without loss in flexibility or appearance or character of the structure and without increasing the weight of the unit. It will be apparent that other means for actuation of the bed frame parts can be adapted to the practice of this invention and that the actuating means may be arranged in various ways to provide the desired force relationships but that the force sectors must be between members rigid with the frame sections and offset from their pivots to provide lines of force located to one side or the other of the pivots for operation.

It will be understood that other changes may be made in the details of construction, arrangement and operation, without departing from the spirit of the invention, especially as defined in the following claims.

We claim:

1. In a sofa bed, a sofa frame, a bed frame pivoted at one end onto the sofa frame for folding and unfolding movements into and out of the sofa respectively from between sofa and bed positions respectively, said bed frame consisting essentially of an outer frame section, an outer intermediate frame section, an inner intermediate frame section, and an inner frame section with the inner end of the inner section pivoted onto the sofa frame and with the other frame sections pivotally interconnected at their adjacent ends for rocking movement of the frame sections into endwise alignment with one another in unfolded, bed position and with the adjacent frame section extending substantially perpendicularly from one another in folded, sofa position, a lever arm pivoted at one end to the lower forward end portion of the sofa frame and pivotally connected at the other end portion to the inner intermediate section whereby the latter is carried upwardly and rearwardly and then rearwardly and down to extend horizontally between the vertically extending inner section and outer intermediate section in the lower portion of the sofa frame, when in sofa position, and which is carried upwardly and forwardly and then forwardly and down to extend horizontally between the aligned inner section and the outer intermediate section, when in unfolded bed position, a link pivotally connected at one end to an intermediate portion of the outer section, another link pivotally connected at one end with the forward end portion of the inner intermediate section, said links being interconnected one to the other at their free ends at a level above their pivots at the opposite ends when the frames are in unfolded position, an elongate power operated member pivotally connected at its outer end to the connection between said links and pivotally connected at the other end to said sofa frame, and means for effecting endwise displacement of said power operated arm toward the pivotal connection to the sofa whereby the outer section is rocked about its pivot to its folded position perpendicular to the outer intermediate section and the outer intermediate section is rocked about its pivot to a folded position substantially perpendicular to the inner intermediate section and whereby continued rearward displacement of said power operated arm causes rearward displacement of the remaining sections as controlled by the lever arm to carry the folded sections and inner intermediate section rearwardly and upwardly and then rearwardly and downwardly into the sofa frame to sofa position and whereby outward displacement of said power operated member causes movement of said inner and inner intermediate sections to an unfolded position and rocking movement to said outer and outer intermediate sections through said links from folded to unfolded bed position.

2. A sofa bed as claimed in claim 1 in which the power operated means comprise a hydraulic cylinder and piston having one pivotally connected at one end of the sofa frame while the other is pivotally connected at its opposite end with the pivotal connection between the links.

3. A power operated sofa bed as claimed in claim 1 in which the power operated member comprises a rack bar and housing in endwise alignment with the outer end of one pivotally connected to the links and the opposite end of the other is pivotally connected to the sofa frame, and means for endwise displacement of the rack bar relative to the housing comprising a driving gear fixed to the housing and in operative engagement with the rack bar and means for imparting rotational movement to the gear.

4. A power operated sofa bed as claimed in claim 1 in which the power operated member comprises an elongate worm and housing in endwise alignment with the outer end portion of one pivotally connected to the links and the opposite end portion of one pivotally connected to the sofa frame, and means for imparting endwise displacement of the worm relative to the housing comprising a worm gear mounted for rotational movement of the housing in operative engagement with the worm and means for imparting rotational movement to the worm gear.

References Cited in the file of this patent

UNITED STATES PATENTS

| | | |
|---|---|---|
| 2,505,989 | Pokorny et al. | May 2, 1950 |
| 2,520,849 | McVicker | Aug. 29, 1950 |
| 2,807,030 | Fox | Sept. 24, 1957 |